Sept. 10, 1929.  M. J. BLAKE  1,727,391

METHOD OF MOLDING INNER TUBES

Filed Dec. 1, 1927

INVENTOR.
Michael J. Blake
BY
Edward Taylor
ATTORNEY.

Patented Sept. 10, 1929.

1,727,391

UNITED STATES PATENT OFFICE.

MICHAEL J. BLAKE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

METHOD OF MOLDING INNER TUBES.

Application filed December 1, 1927. Serial No. 236,945.

This invention relates to the manufacture of inner tubes for pneumatic tires, and has particular reference to the formation of tubes by the use of individual molds or vulcanizers. One object of the invention is to avoid excessive stretching of any part of the tube during molding, thereby maintaining a uniform gauge throughout the tube section. A further object is to provide a method of tube manufacture which permits of great rapidity in the assembling of the tube and mold and in the introduction of the fluid expansive pressure within the tube. Other objects will appear from the following description and the claims.

Referring to the drawings.

Figure 1:
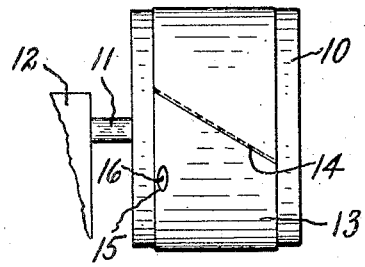
Fig. 1 is a detail of a tube building drum, showing a partially constructed tube thereon.
Figures 2, 3:
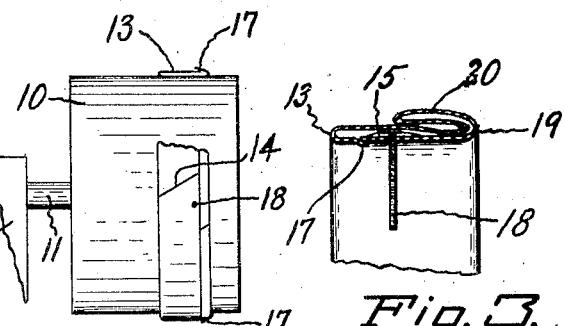
Fig. 2 is a similar view showing the completely seamed tube.
Fig. 3 is a section of the unvulcanized tube prepared for molding in accordance with my invention.

Various ways of forming the rubber preparatory to vulcanization may be employed, such as extruding the rubber in tubular form and splicing the ends. I prefer, however, to build up the tube from a calendered sheet upon a drum 10, which may be rotatably mounted on a shaft 11 extending from a support 12. The rubber sheet 13, being cut to the desired length, preferably on the bias as at 14, is laid around the drum with its bias ends slightly overlapped and stuck together. A valve pad 15 with a hole 16 therein is laid on the stock. The sheet is now dusted with soapstone or mica, folded over upon itself laterally, and a longitudinal seam 17 made progressively around the circumference by cleaning off the soapstone and pressing the edges together with a slight lap. The valve stem 18 is inserted through the hole in the valve pad and forced through the overlying rubber sheet before the seam is completed, the portion of rubber cut out by the insertion of the valve stem is removed, and finally all seams are pressed tightly together, completing the formation of the tube.

The tube formed by the method described or by any other method desired, is ready for vulcanization. It is now common to cure tubes in individual steam heated molds, whereby the tube is cured endless and in the curved form which it has to assume when in use in a tire casing. The molds are kept hot continually, whether tubes are in them or not, so that when a tube is placed in a mold it is immediately subjected to heat. Difficulty has been experienced in the vulcanization of tubes by this method by reason of the tube thinning down at the areas so heated as soon as the inflating pressure is applied. In order to insure that the tube lies evenly in the mold it has been, as far as I am aware, universal practice before the mold is closed to inflate the tube a sufficient amount to expand it roughly into shape. During the time necessarily elapsing for this operation the areas in contact with the hot mold stretch more than the cold portions of the rubber, giving an uneven thickness to the tube. According to my invention I do away with trouble from this source by cutting to a minimum the elapsed time between the insertion of the tube in the mold and the application of full expansive pressure to the tube within the completely closed mold, and by starting the application of pressure and the closing of the molds substantially simultaneously.

In preparing the completely formed tube for vulcanization I fold it longitudinally along a line 19 approximately one-third to one-half of the distance across the tube, forming an overlapped portion 20 which partially or completely covers the part of the tube beneath it. The tube is now ready for insertion in the mold, which I have shown in the present case as having an integral central section 21 chambered for steam circulation at 22 and having a valve stem aperture 23. The preliminary folding of the tube permits it to be more quickly and accurately placed in the mold than if the fold were omitted. A plurality of outer sections 24 (preferably two) are similarly chambered at 25 and fit snugly around the inner section. Both sections are formed with mating curved surfaces cooperating to form an annular cavity 26 generally circular in cross-section.

Figure 6:
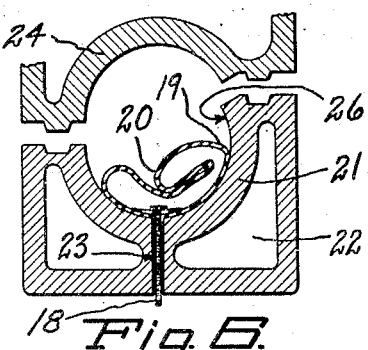
Fig. 6 is a similar view with the tube partially inflated.
Figure 4:
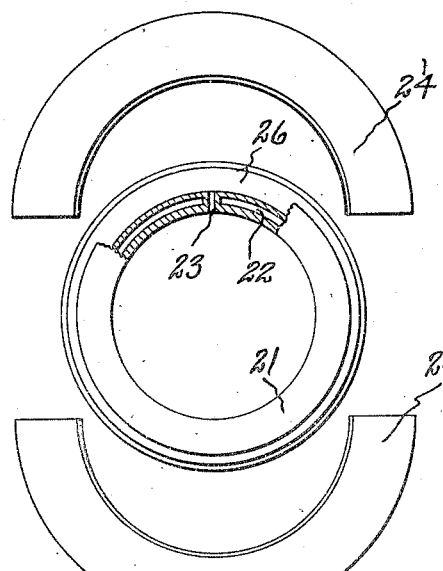
Fig. 4 is a diagrammatic side elevation of a preferred form of mold.
Figure 7:
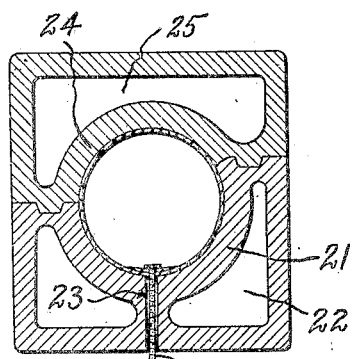
Fig. 7 is a sectional view through the tube and mold during vulcanization.
Figure 5:
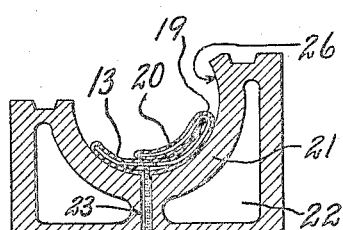
Fig. 5 is a section through the central mold member with a tube in place but uninflated.

The folded tube is laid in the inner mold section with the valve stem 18 extending through the aperture 23 as shown in Fig. 5. Air is now admitted through the valve stem, and the outer sections are, preferably simultaneously with the introduction of the air, closed about the inner section. An intermediate condition is shown in Fig. 6, the outer sections being almost closed and the tube being partially inflated. As inflation proceeds the fold straightens out and the tube conforms to the interior of the cavity. As has been pointed out above, the rapidity of closing the mold and of applying the internal pressure removes the difficulties previously experienced because of the hot parts of the rubber stretching more easily than the cold parts and preserves the evenness of the gauge of the tube. The smoothness with which the folded tube can be placed in the mold greatly reduced the danger of wrinkles or buckles, and the compactness of the folded tube keeps it away from the parting lines of the mold until the mold is closed and thus removes the danger of pinching.

Having thus described my invention, I claim:

1. A method of molding an endless rubber tube which consists in folding the tube transversely upon itself, introducing the folded tube into a mold, and subsequently inflating the tube.

2. A method of molding an endless rubber tube which consists in folding the tube transversely upon itself, introducing the folded tube into an open mold, and substantially simultaneously closing the mold and inflating the tube.

3. A method of molding an endless rubber tube which consists in folding the tube transversely upon itself, introducing the folded tube into an open mold having a cavity of substantially the cross-sectional periphery of the tube when unfolded and inflated but unstretched, and substantially simultaneously closing the mold and inflating the tube.

4. A method of molding an endless rubber tube which consists in folding the tube transversely upon itself, placing the folded tube in a molding cavity formed upon the outer surface of an annular mold section, and substantially simultaneously applying outer mold sections around the inner section and inflating the tube.

5. The method of making a hollow rubber article which comprises forming a re-entrant fold in a wall of the article while the latter is in an unfinished state, enclosing the article in its folded condition in a mold, distending the article in the mold by internal fluid pressure, whereby the article is caused to extend its contact with the mold-cavity walls progressively, and vulcanizing the article in the mold.

6. The method of making an annular rubber tube which comprises forming the tube with a re-entrant fold giving it a double-walled U-form in cross-section, enclosing the tube in a mold, distending it in the mold by internal fluid pressure, and vulcanizing it while it is so distended.

MICHAEL J. BLAKE.